US011050603B2

(12) United States Patent
Jian et al.

(10) Patent No.: US 11,050,603 B2
(45) Date of Patent: Jun. 29, 2021

(54) SUPERPOSITION-BASED TRANSCEIVER APPARATUS FOR EFFICIENT SPECTRUM UTILIZATION IN MICROWAVE BACKHAUL LINKS

(71) Applicant: Huawei Technologies Canada Co., Ltd., Kanata (CA)

(72) Inventors: Ming Jian, Kanata (CA); Ayman Mostafa Mohammad Mostafa Mostafa, Fremont, CA (US); Lutz Hans-Joachim Lampe, Vancouver (CA); Hoda Shahmohammadian, San Diego, CA (US); Jordan Philip Naterer, Vancouver (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 16/844,703

(22) Filed: Apr. 9, 2020

(65) Prior Publication Data
US 2020/0328928 A1    Oct. 15, 2020

Related U.S. Application Data

(60) Provisional application No. 62/833,338, filed on Apr. 12, 2019.

(51) Int. Cl.
*H04L 5/16* (2006.01)
*H04L 27/34* (2006.01)
(Continued)

(52) U.S. Cl.
CPC ........ *H04L 27/3488* (2013.01); *H04L 1/0057* (2013.01); *H04L 25/03343* (2013.01); *H04L 27/3405* (2013.01); *H04L 2025/03356* (2013.01)

(58) Field of Classification Search
CPC .......... H04L 27/3488; H04L 25/03343; H04L 1/0057; H04L 27/2601; H04L 25/0232; H04L 25/0204; H04L 5/0048
(Continued)

(56) References Cited

U.S. PATENT DOCUMENTS

| 2011/0122969 | A1* | 5/2011 | Oh ..................... H04L 27/3881 375/302 |
| 2012/0216093 | A1* | 8/2012 | Djordjevic .......... H03M 13/253 714/755 |

(Continued)

FOREIGN PATENT DOCUMENTS

WO    2017028764 A1    2/2017

OTHER PUBLICATIONS

Rummler, "A new selective fading model: Application to propagation data," Bell System Technical Journal, vol. 58, No. 5, pp. 1037-1071, 1979.

(Continued)

*Primary Examiner* — Khai Tran
(74) *Attorney, Agent, or Firm* — BCF LLP

(57) ABSTRACT

The disclosed systems, structures, and methods are directed to a superposition based transceiver. The configurations presented herein employ a plurality of encoders configured to encode a plurality of input digital data streams, wherein each of the plurality of input digital data streams operates at different data rates, a plurality of modulators configured to modulate the plurality of encoded digital data input streams. In addition, a plurality of transmitter filters configured to perform up-sampling and filtering of the plurality of modulated digital data streams, and a signal mixer configured to combine the plurality of up-sampled and filtered digital data streams into a single aggregate digital data stream in a manner such that the single aggregate digital data stream (Continued)

contains spectral characteristics that substantially conform to both a central area and a skirt area of a unified spectral emission mask, as specified by European Telecommunications Standards Institute (ETSI).

18 Claims, 10 Drawing Sheets

(51) Int. Cl.
  *H04L 25/03*   (2006.01)
  *H04L 1/00*   (2006.01)

(58) Field of Classification Search
  USPC .......................... 375/219, 143, 144
  See application file for complete search history.

(56) References Cited

U.S. PATENT DOCUMENTS

| | | | |
|---|---|---|---|
| 2012/0269234 A1* | 10/2012 | Zhang | H04L 27/2653 375/143 |
| 2016/0080087 A1 | 3/2016 | Koike-Akino et al. | |
| 2019/0097677 A1 | 3/2019 | Sen et al. | |
| 2020/0267031 A1* | 8/2020 | Xu | H04B 10/6971 |

OTHER PUBLICATIONS

International Search Report and Written Opinion dated Jun. 11, 2020 from the ISA/CA in connection with the PCT corresponding A Application No. PCT/CA2020/050483.

* cited by examiner

SUPERPOSITION-BASED TRANSCEIVER APPARATUS FOR EFFICIENT SPECTRUM UTILIZATION IN MICROWAVE BACKHAUL LINKS

CROSS-REFERENCE TO RELATED APPLICATIONS

This application is related to previously-filed U.S. Provisional Application No. 62/833,338 entitled "SUPERPOSITION-BASED TRANSCEIVER APPARATUS FOR EFFICIENT SPECTRUM UTILIZATION IN MICROWAVE BACKHAUL LINKS," filed on Apr. 12, 2019.

FIELD OF THE INVENTION

The present invention generally relates to the field of microwave communications and, in particular, to a superposition-based transceiver apparatus for efficient utilization of spectrum in microwave backhaul links.

BACKGROUND

In view of increasing high speed data transmission requirements (e.g., up to 10 Gbps or more), data transmission employing microwave backhaul links faces the considerable challenge of providing high-capacity transmission at low cost/bit. The available frequency spectrum for microwave backhaul link resources is becoming scarce and more expensive, due to constant increases in demand.

As such, microwave backhaul links need to enhance the spectral efficiency of their associated transceiver apparatuses through efficient signal processing techniques. Moreover, the modulation schemes and the corresponding data rates employed by microwave transmission links also need to conform to certain spectral emission mask requirements, as specified by the European Telecommunications Standards Institute (ETSI).

With this said, conventional transceiver apparatuses transmit and receive input digital data stream that have been encoded, modulated, and filtered using microwave backhaul links. In so doing, the filtering techniques employed by conventional transceiver apparatuses are mostly directed to limiting the transmission of input digital data stream in central portions of the spectral emission mask. The challenge of utilizing the skirt areas of the spectral emission mask by increasing the bandwidth of input digital data stream may be further exacerbated, as the resultant spectrum may violate the specified spectral emission mask requirements.

It will be appreciated that the transmission of input digital data stream in the central portions without utilizing the skirt areas of the spectral emission mask, compromises the spectral efficiency and data transmission capacity of microwave backhaul links.

SUMMARY

An object of the present disclosure is to provide superposition based transceiver. The disclosure presented herein employs a plurality of encoders configured to encode a plurality of input digital data streams, wherein each of the plurality of input digital data streams operates at different data rates. A plurality of modulators configured to modulate the plurality of encoded digital data input streams. A plurality of transmitter filters configured to perform up-sampling and filtering of the plurality of modulated digital data streams. a signal mixer configured to combine the plurality of up-sampled and filtered digital data streams into a single aggregate digital data stream in a manner such that the single aggregate digital data stream contains spectral characteristics that substantially conform to both a central area and a skirt area of a unified spectral emission mask, as specified by European Telecommunications Standards Institute (ETSI).

In accordance with other aspects of the present disclosure, the superposition based transceiver wherein each of the plurality of encoded digital data streams is modulated at a different order of m-ary modulation scheme in accordance with the respective data rates of each of the plurality of input digital data streams and each of the plurality modulated digital data streams is up-sampled in accordance with their respective data rates.

In accordance with other aspects of the present disclosure, the superposition based transceiver wherein each of the plurality of up-sampled digital data streams is filtered in accordance with their respective data rates and the plurality of transmitter filters are configured to operate as root raised cosine (RRC) filters.

In accordance with other aspects of the present disclosure, there is provided a method of superposition based transmission and reception of data streams. The disclosure presented herein operates to encode a plurality of input digital data streams, wherein each of the plurality of input digital data streams operates at different data rates, up-sample and filter the plurality of modulated digital data streams, combine the plurality of up-sampled and filtered digital data streams into a single aggregate digital data stream in a manner such that the single aggregate digital data stream contains spectral characteristics that substantially conform to both a central area and a skirt area of a unified spectral emission mask, as specified by European Telecommunications Standards Institute (ETSI).

In accordance with other aspects of the present disclosure, the method of superposition based transmission and reception of data streams wherein each of the plurality of encoded digital data streams is modulated at a different order of m-ary modulation scheme in accordance with the respective data rate of each of the plurality of input digital data stream and each of the plurality modulated digital data streams is up-sampled in accordance with their respective data rates.

In accordance with other aspects of the present disclosure, the method of superposition based transmission and reception of data streams wherein each of the plurality of up-sampled digital data streams is filtered in accordance with their respective data rates and the up-sampling and filtering the plurality of modulated data input streams are based on root raised cosine (RRC) filters.

BRIEF DESCRIPTION OF THE FIGURES

The features and advantages of the present disclosure will become apparent from the following detailed description, taken in combination with the appended drawings, in which.

Figure 1A:
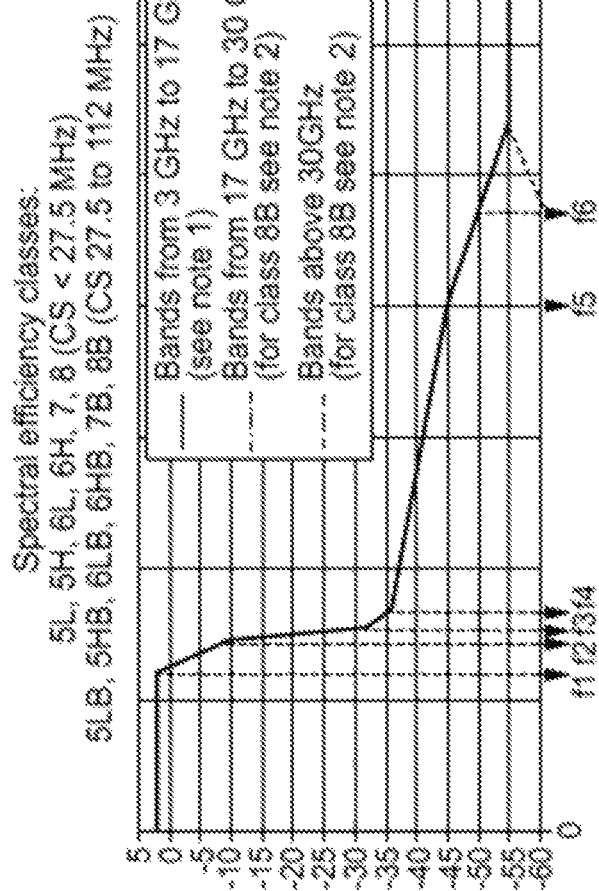
FIG. 1A (Prior Art) depicts an exemplary unified spectral mask specified by ETSI.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

FIG. 1A (Prior Art) illustrates a representative unified spectral mask, as specified by ETSI. The spectrum masks limits are necessary for a variety of intra-system, inter-system regulatory and performance requirements. The 0 dB level shown on the spectrum masks relates to the power spectral density at the carrier center frequency.

FIG. 1A also illustrates various corner points corresponding to different power spectral densities for frequency bands in the range below 57 GHz having a channel spacing of up to 112 MHz. For example, corner points corresponding to power spectral densities 2 dB, −10 dB, −32 dB, −36 dB, and −45 dB are 12 MHz, 14.5 MHz, 15.5 MHz, 17 MHz, and 40 MHz respectively. Further, FIG. 1 lists various spectral efficiency classes of equipment defined to operate under the unified spectral mask. For example, spectral efficiency classes 5 LB, 5 HB, 6 LB, 6 HB, 7 B, and 8 B are defined for equipment with spectral efficiency based on typical 64, 128, 256, 512, 1024, and 2048 state modulation schemes, respectively.

Figure 1B:
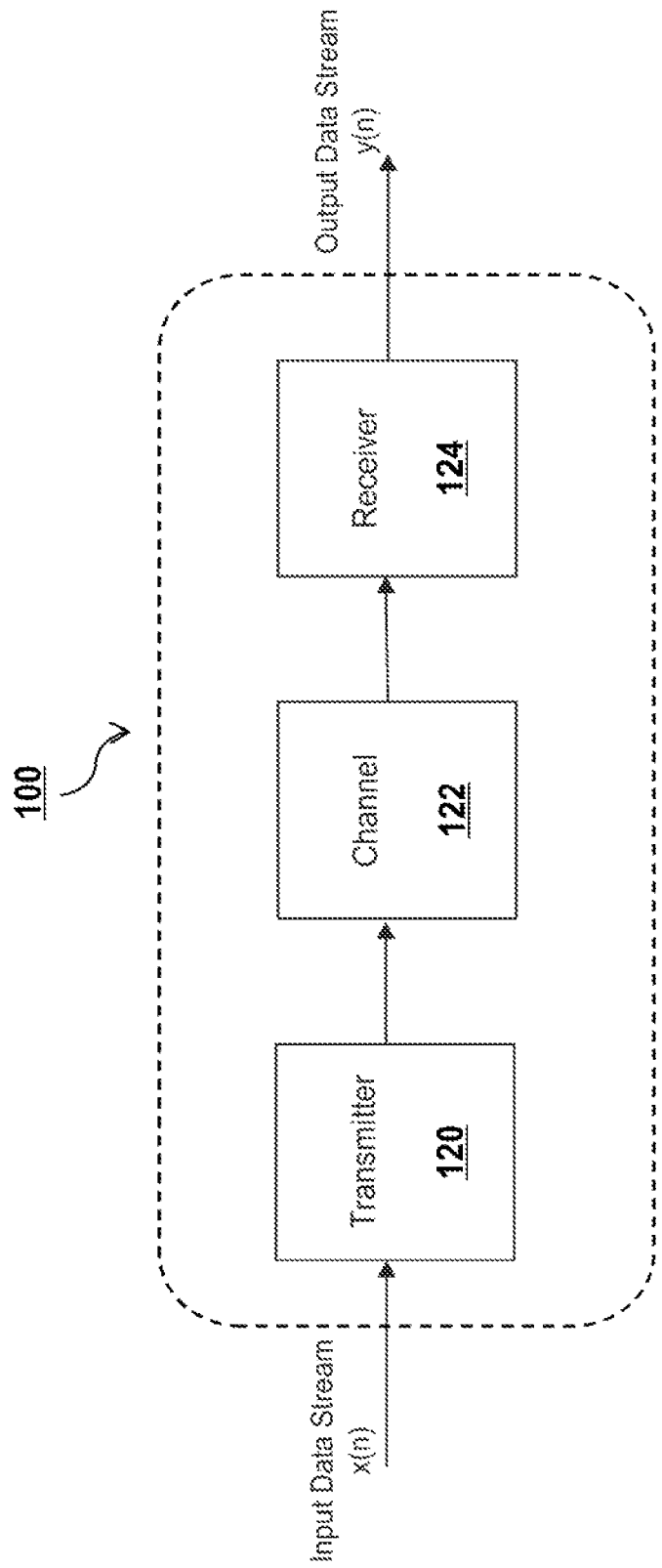
FIG. 1B (Prior Art) depicts a high-level functional block diagram of conventional transceiver apparatus.

FIG. 1B (Prior Art) further illustrates a high-level functional block diagram of conventional transceiver apparatus 100 directed to processing and transmitting the input digital data stream and then receiving and processing the received stream to generate output data stream. The conventional transceiver apparatus 100 includes a transmitter 120, a channel 122, and a receiver 124. It will be understood that other elements may be present, but are not illustrated for the purpose of tractability and simplicity.

As shown in FIG. 1B, transmitter 120 is configured to receive an input digital data stream x(n). The transmitter 120 is configured to process and transmit input digital data stream x(n). In so doing, transmitter 120 encodes and modulates input digital data stream x(n). The transmitter 120 then filters the modulated data stream using a root raised cosine (RRC) filter in order to conform the spectrum of modulated data stream to the unified spectral mask specified by ETSI.

As shown, the filtered input digital data stream x(n) is subsequently transmitted to channel 122, which may be embodied by a suitable backhaul link channel. While traveling through backhaul link channel 122, transmitted data stream x(n) may be affected by phase noise as well as Additive White Gaussian Noise (AWGN). It will be understood that channel 122 may comprise any suitable backhaul link.

In turn, receiver 124 receives the data stream x(n) transmitted across channel 122 and is configured to process the transmitted data streams x(n) to provide an output data stream y(n). In so doing, receiver 124 filters the received data stream x(n) to compensate for the phase noise and AWGN effects as well as provide equalization and phase noise compensation to effectively demodulate and decode the received data stream to provide output data stream y(n) that correspond to the input digital data stream x(n).

Figure 1C:
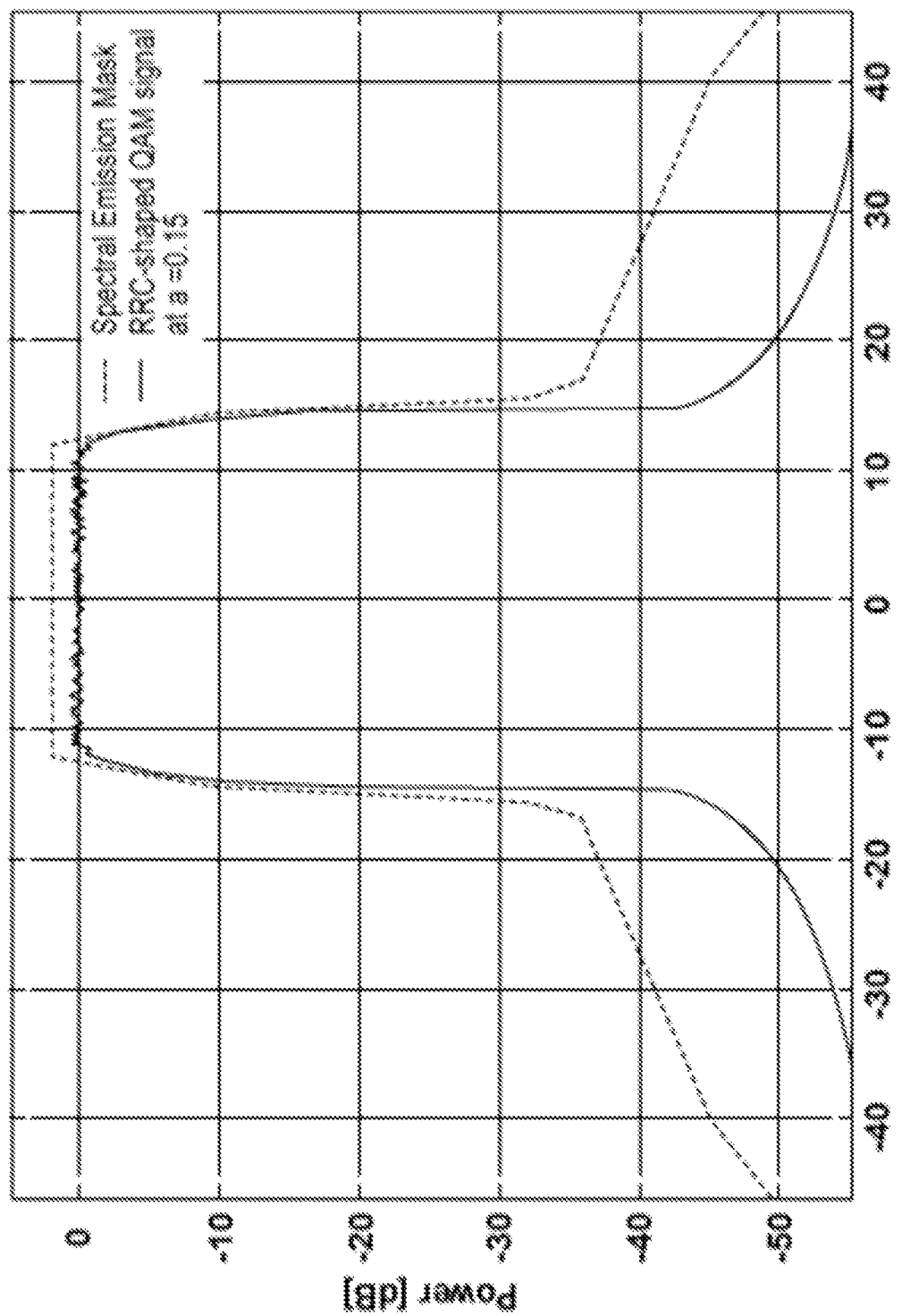
FIG. 1C (Prior Art) depicts an exemplary response of conventional transceiver apparatus.

FIG. 1C (Prior Art) illustrates a model channel response characteristic based on the ETSI spectral emission mask and a representative channel response for conventional transceiver apparatus 100 employing a Root Raised Cosine (RRC) technique. The representative response is based on a QAM modulated signal with a channel spacing of 28 MHz. As shown, a Root Raised Cosine (RRC) shaping filter with a roll-off factor of 0.15 can provide a maximum baud rate of 25.6 MHz while still complying with ETSI emission mask requirements. As noted above and as shown in FIG. 1C, conventional transceiver apparatus 100 employing a Root Raised Cosine (RRC) technique substantially utilizes a central portion of the channel response of the ETSI spectral emission mask. However, as also shown, apparatus 100 is unable to utilize a substantial portion of the channel response skirt area, thereby placing limitations on data transmission capacity using backhaul links.

Figure 2A:
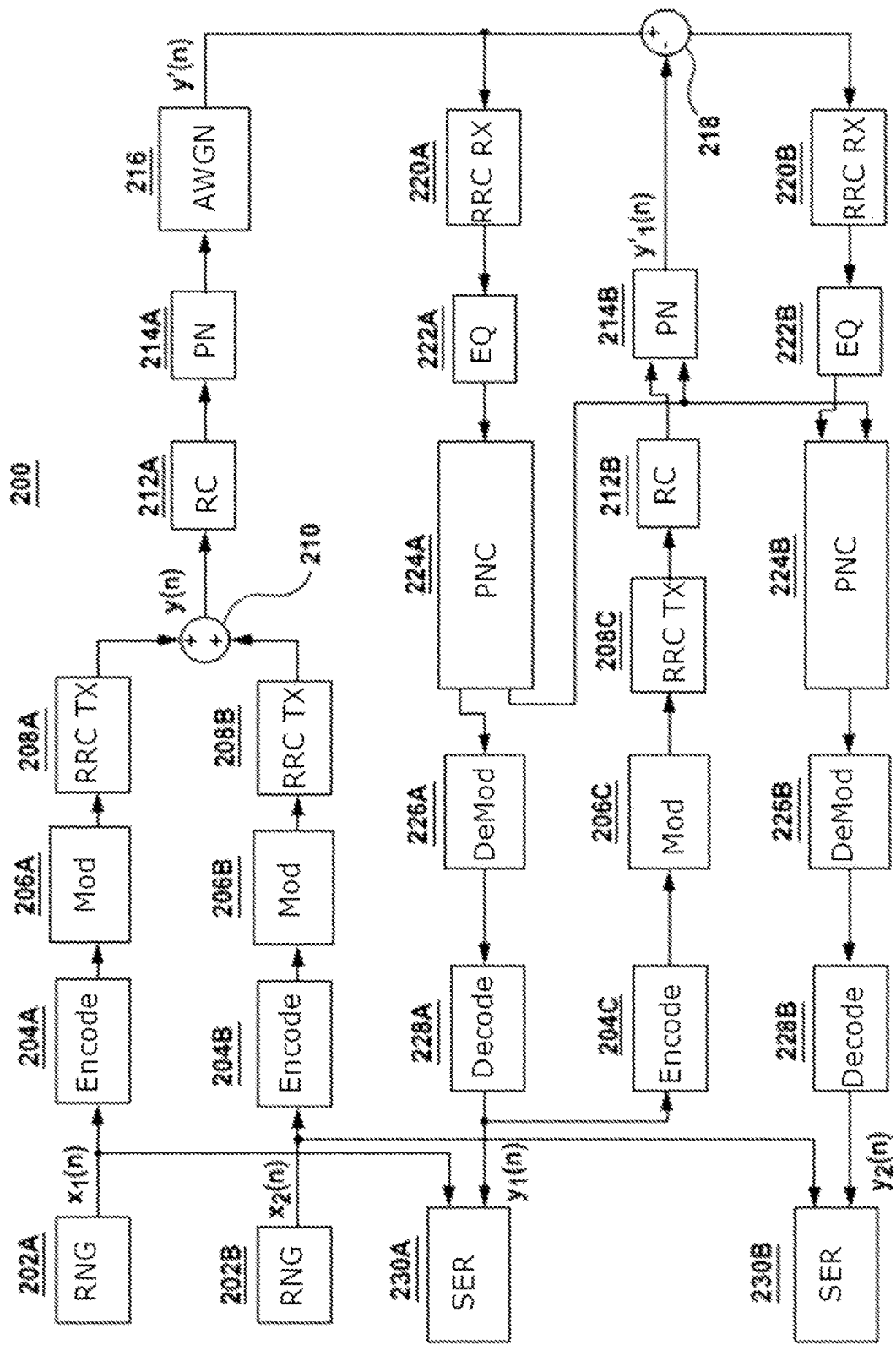
FIG. 2A depicts a high-level functional block diagram of a superposition based transceiver apparatus, in accordance with various embodiments of the present disclosure.

As noted above, input digital data streams x(n) compromises the spectral efficiency and data transmission capacities of backhaul link channel. In an effort to address these issues, FIG. 2A depicts a functional block diagram of a superposition-based transceiver apparatus 200, in accordance with various embodiments of the present disclosure. As shown, superposition transceiver 200 incorporates a plurality of data sources 202A, 202B, a plurality of encoders 204A, 204B, 204C, a plurality of modulators 206A, 206B, 206C, a plurality of RRC transmitter filters 208A, 208B, 208C, a plurality of signal mixers 210, 218, a plurality of RRC receiver filters 220A, 220B, a plurality of signal equalizers 222A, 222B, a plurality of phase noise compensation modules 224A, 224B, a plurality of de-modulators 226A, 226B, and a plurality of decoders 228A, 228B.

Transceiver 200 is configured to operate under the assumption that the transmission channel may be dispersive and introduce phase noise and AWGN noise. In certain embodiments, the transmission channel may be modeled by Rummler channel module 212A, 212B. A plurality of phase noise module 214A, 214B, AWGN module 216, and a plurality of error rate calculation modules 230A, 230B may further be employed in super-position transceiver 200.

As will be understood in view of the ensuing descriptions and, in accordance with various embodiments of the present disclosure, the implementation of multiple RRC transmitter filters 208A, 208B, 208C operate to effectively use the unified spectral mask specified by ETSI by utilizing the central portions in conjunction with the skirt area of spectral emission mask for data transmission while maintaining data recovery integrity. In so doing, superposition based transceiver 200 substantially increases data transmission capacity using backhaul links.

Moreover, consistent with various embodiments of the present disclosure, it will be appreciated that some or all of the notable elements of superposition-based transceiver 200, may be implemented by software and firmware constructs to facilitate integration with existing transceiver architectures.

As discussed above relative to conventional transceiver apparatus 100, a single source of input digital data stream x(n) is employed. However, as illustrated in FIG. 2A, superposition based-transceiver 200 implements two sources of input digital data streams. Further, superposition-based transceiver 200 is configured to process two input digital data streams in order to utilize the unified spectral mask more efficiently.

As shown in FIG. 2A, at the transmitter side of superposition-based transceiver 200, data source 202A generates a first input digital data stream $x_1(n)$ at a first data rate. Such as, for example, 25 MHZ. However, it will be understood that data source 202A may be capable of producing input digital data stream $x_1(n)$ at any data rate.

Data source 202A then may supply the input digital data stream $x_1(n)$ to encoder 204A. Encoder 204A encodes the supplied input digital data stream $x_1(n)$ at first data rate. Encoder 204A may be configured as a low-density parity-check (LDPC) encoder or other suitable encoder configurations. Encoder 204A then forwards the encoded data stream $x_1(n)$ to modulator 206A. Modulator 206A then modulates the encoded data stream at a first order of m-ary modulation scheme, such as, for example, 4096-QAM and generates a high power modulated digital data stream. Modulator 206A then may supply the modulated digital data stream $x_1(n)$ to RRC transmitter filter 208A.

Design parameters for RRC transmitter filter 208A may be sampling frequency, roll-off factor, and data rate. For a given roll-off factor, RRC transmitter filter 208A may perform up-sampling on modulated digital data stream $x_1(n)$, depending up on and data rate. For example, in case of 4096-QAM with a data rate of 25 MHz, modulated digital data stream $x_1(n)$ may be up-sampled by a factor of four.

Further, RRC transmitter filter 208A may be configured such that most of the spectral components of modulated digital data stream $x_1(n)$ filtered by RRC transmitter filter 208A fall within central portions of the unified spectral mask, such that the spectrum of filtered data stream $x_1(n)$ may have a high power, narrowband spectrum. Filtered digital data stream $x_1(n)$ may then be forwarded to signal mixer 210.

In a similar manner, data source 202B generates a second input digital data stream $x_2(n)$ at a second data rate. Such as, for example, 50 MHZ. However, it will be understood that data source 202B may be capable of producing input digital data stream $x_2(n)$ at any data rate. In certain embodiments first data rate may be different from second data rate.

Data source 202B then may supply the input digital data stream $x_2(n)$ to encoder 204B. Encoder 204B may be configured as a low-density parity-check (LDPC) encoder or as other suitable encoder configurations. Encoder 204B encodes the supplied input digital data stream $x_2(n)$ at second data rate and then forwards the encoded data stream $x_2(n)$ to modulator 206B.

Modulator 206B then modulates the encoded data stream at a second order of m-ary modulation scheme, such as, for example, 4-QAM and generates a low power modulated digital data stream. Modulator 206B may then supply the modulated digital data stream $x_2(n)$ to RRC transmitter filter 208B.

Similar to transmitter filter 208A, design parameters for RRC transmitter filter 208B may be sampling frequency and roll-off factor, and data rate. For a given roll-off factor, RRC transmitter filter 208B may perform up-sampling on modulated data stream $x_2(n)$, depending on the data rate. For example, in case of 4-QAM with a data rate of 50 MHz, modulated digital data stream $x_2(n)$ may be up-sampled by a factor of two.

Further, RRC transmitter filter 208B may be configured such that the spectral components of modulated digital data stream $x_2(n)$ that are filtered by RRC transmitter filter 208B fall within central portions as well as in skirt area of the unified spectral mask. As such, the filtered digital data stream $x_2(n)$ may have a low power wideband spectrum when compared to the spectrum of filtered data stream $x_1(n)$. Filtered data stream $x_2(n)$ may be then forwarded to signal mixer 210.

In turn, signal mixer 210 may be configured to mix filtered data stream $x_1(n)$ and filtered data stream $x_2(n)$ to form an aggregate digital data stream y(n), such that the spectrum of aggregate data stream y(n) conforms to the unified spectrum mask in both the central portions and skirt area. In so doing, the data transmission capacity of the backhaul links are considerably increased.

Figure 2B:
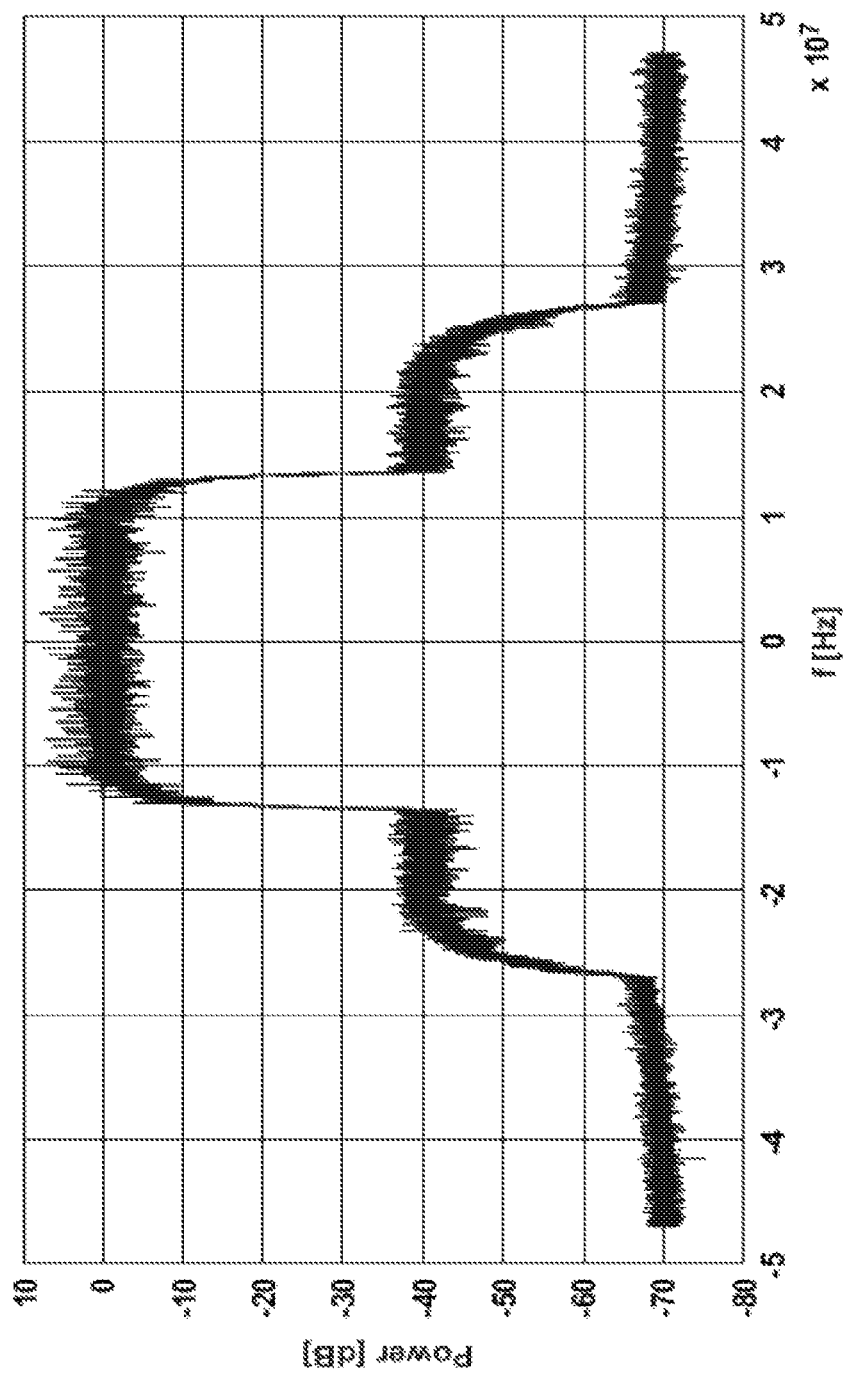
FIG. 2B depicts a depicts an exemplary power spectral density graph of composite data stream, in accordance with various embodiments of the present disclosure.

FIG. 2B, depicts a representative power spectral density (PSD) graph of aggregate digital data stream y(n), in accordance with various embodiments of the present disclosure. As shown, the high-power narrowband spectral components are superimposed with low-power wideband spectral components. The PSD shape of aggregate digital data stream y(n) conforms to the criteria of the unified spectral mask regulations. To ensure that the two streams may be synchronized during each frame transmission, the bandwidth of the lower power stream may be selected to be twice the bandwidth of the higher power stream.

Returning to FIG. 2A, aggregate digital data stream y(n) may be then sent over a dispersive channel. In certain embodiments, the transmission channel may be modeled by Rummler channel module 212A. It will be understood that, any suitable channel for transmission can be modeled, such as, for example, Rayleigh channel. Further, the effect of phase noise as well as AWGN experienced by aggregate data stream y(n) in channel may be modeled by phase noise module 214A and AWGN module 214A respectively. As shown in FIG. 2A, at the receiver side of superposition based transceiver 200, noise effected aggregate digital data stream y'(n) may be processed and segregated to provide output digital data streams $y_1(n)$ and $y_2(n)$ corresponding to input digital data streams $x_1(n)$ and $x_2(n)$.

RRC receiver filter 220A receive noise effected aggregate data stream y'(n) and the design parameters for RRC receiver filter 220A may be sampling frequency and roll-off factor. For a given roll-off factor, RRC receiver filter 220A may perform down-sampling on noise effected aggregate data stream y'(n), such as, for example, in case of 4096-QAM, noise effected aggregate data stream y'(n) may be down-sampled by a factor of four.

Further, RRC receiver filter 220A may be configured to extract spectral components associated with input digital data stream $x_1(n)$, that falls mostly in central portions of the unified spectral mask. Also, RRC receiver filter 220A may be matched with RRC transmitter filter 208A and filtered aggregate data stream y'(n) may be then forwarded to signal equalizer 222A.

In turn, signal equalizer 222A in conjunction with phase noise compensation module 224A may be configured to mitigate the effect of distortion may be incurred to aggregate data stream y'(n) while transmission through the dispersive channel. In so doing, signal equalizer 222A and phase noise compensation module 224A may treat the spectral components associated with input digital data stream $x_2(n)$ as noise.

Further, the baseband processing of input digital data stream $x_1(n)$ through signal equalizer 222A and phase noise compensation module 224A may provide inter-symbol interference (ISI) mitigation via equalization, pilot-aided carrier phase estimation (CPE) and phase noise compensation (PNC) using the Bahl-Cocke-Jelinek-Raviv (BCJR) algorithm. Equalized and phase noise compensated digital data stream is subsequently transmitted downstream for further processing.

Going forward, de-modulator 226A performs de-modulation operation, such as, for example, 4096-QAM, on the digital data stream supplied by phase noise compensation module 224A. De-modulator 226A then supplies the demodulated digital data stream to decoder 228A. Decoder 228A then performs decoding operation to output digital data stream $y_1(n)$ in correspondence with input digital data stream $x_1(n)$.

The decoded digital data stream $y_1(n)$ further assists in decoding of digital data stream $x_2(n)$. That is, digital data stream $y_1(n)$ is again processed, and eventually subtracted from noise effected aggregate data stream y'(n). During processing, decoder 228A supplies decoded digital data stream $y_1(n)$ to encoder 204C. Encoder 204C then encodes the supplied digital data stream $y_1(n)$ and forward the encoded digital data stream $y_1(n)$ to modulator 206A. Modulator 206A then modulates the encoded digital data stream $y_1(n)$ at a first order of m-ary modulation scheme, such as, for example, 4096-QAM and generates a high power modulated digital data stream $y_1(n)$. Modulator 206A then may supply the modulated digital data stream $y_1(n)$ to RRC transmitter filter 208C.

It will be understood that, RRC transmitter filter 208C may be configured to perform filtering and up-sampling on modulated digital data stream $y_1(n)$ in a similar manner as RRC transmitter filter 208A.

In certain embodiments, to manifest the effect of dispersive channel, filtered data stream $y_1(n)$ from RRC transmitter filter 208C may be supplied to Rummler channel module 212B. Further, the digital data stream from Rummler channel module 212B is supplied to phase noise module 214B. To mimic the effect of phase noise in dispersive channel, phase noise compensation module 224A supplies the calculated phase to phase noise module 214B. Phase noise module 214B mix the digital data stream from Rummler channel module 212B and calculated phase supplied by phase noise compensation module 224A to regenerate high power data stream $y'_1(n)$.

Regenerated high power data stream $y'_1(n)$ may be then supplied to signal mixer 218. Signal mixer 218 may be configured to subtract regenerated high power data stream $y'_1(n)$ from noise effected composite data stream y'(n). The remaining data stream is then processed to provide output data stream $y_2(n)$ corresponding to input digital data streams $x_2(n)$.

To this end, RRC receiver filter 220B, matched with RRC receiver filter 220A, may be configured to perform down-sampling on the low power digital data stream supplied by signal mixer 218. For example, in case of 4-QAM, low power data stream supplied by signal mixer 218 may be down-sampled by a factor of two. Also, RRC receiver filter 220B may operate to extract the spectral components corresponding to input digital data streams $x_2(n)$. Filtered digital data stream may be then forwarded to signal equalizer 222B.

Signal equalizer 222B in conjunction with phase noise compensation module 224B may operate in similar manner as signal equalizer 222A in conjunction with phase noise compensation module 224A. As such, the baseband processing of input digital data stream $x_2(n)$ through signal equalizer 222B and phase noise compensation module 224B may provide mitigation of inter-symbol interference (ISI) via equalization, pilot-aided carrier phase estimation (CPE), and phase noise compensation (PNC) using the BCJR algorithm.

In order to estimate the phase of carrier, phase noise compensation module 224B may also be supplied with a phase calculated by phase noise compensation module 224A. Equalized and phase compensated input digital data stream $x_2(n)$ may be subsequently transmitted downstream for further processing.

Going forward, de-modulator 226B may perform de-modulation operation, such as, for example, 4-QAM, on the digital data stream supplied by phase noise compensation module 224B. De-modulator 226B may then supply the demodulated data stream to decoder 228B. Decoder 228B then performs decoding operations to output digital data stream $y_2(n)$ in correspondence with input digital data stream $x_2(n)$.

It is to be understood that BCJR based phase estimation may provide some errors for higher-order QAM constellations. In order to compensate the effect of BCJR based phase estimation or otherwise, the plurality of encoders 204A, 204B, 204C and the plurality of decoder 228A, 228B may be based on low-density parity-check (LDPC) encoders and decoders respectively. Further, equalization and phase noise estimation may be achieved by other suitable techniques known in the art without departing from the principles presented herein, such as, for example, based on MMSE equalization.

In certain embodiments, to evaluate the performance of superposition based transceiver apparatus 200, error rate calculation modules 230A and 230B are configured to calculate several evaluation parameters, such as, for example, Bit Error Rate (BER), Signal-to-Noise ratio (SNR), etc.

In so doing, error rate calculation modules 230A is supplied with input digital data stream $x_1(n)$ generated by data source 202A and output digital data stream $y_1(n)$ generated by decoder 228A, to calculate evaluation parameters. Similarly, error rate calculation modules 230B is supplied with input digital data stream $x_2(n)$ generated by data source 202B and output digital data stream $y_2(n)$ generated by decoder 228B to calculate evaluation parameters.

Figure 3:
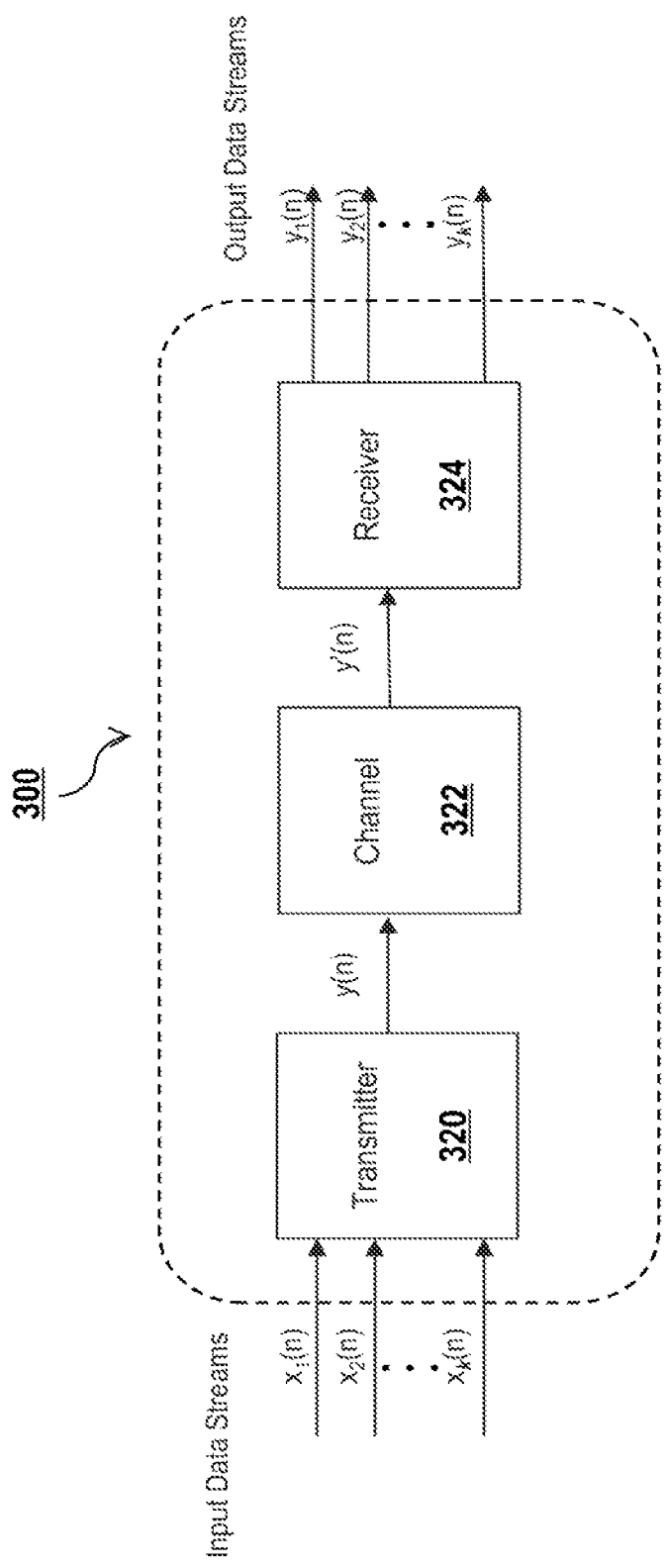
FIG. 3 depicts an exemplary functional block diagram of a superposition based transceiver apparatus, in accordance with various embodiments of the present disclosure.

FIG. 3 depicts an exemplary functional block diagram of a superposition based transceiver apparatus 300, in accordance with various embodiments of the present disclosure. The superposition based transceiver apparatus 300 includes a transmitter 320, a channel 322, and a receiver 324. It will be understood that other elements may be present but not illustrated for the purpose of tractability and simplicity.

As illustrated by FIG. 3, superposition based transceiver apparatus 300 may be capable of processing k input digital data streams $x_1(n)$, $x_2(n)$, $x_3(n)$ . . . $x_k(n)$. To this end, transmitter 320 receives the k input digital data streams $x_1(n)$, $x_2(n)$, $x_3(n)$ . . . $x_k(n)$, in which each data stream may operate under a different data rate. In so doing, transmitter 320 correspondingly encodes the k input digital data streams $x_1(n)$, $x_2(n)$, $x_3(n)$ ... $x_k(n)$ at different data rates. Furthermore, each of the k input digital data streams $x_1(n)$, $x_2(n)$, $x_3(n)$ ... $x_k(n)$ may modulated with a different order of m-ary modulation scheme. Such as, for example, 4-, 16-, 32-, 64-, 128-, 256-, 512-, 1024-, 2048- or 4096-QAM.

Each of the modulated k input digital data stream $x_1(n)$, $x_2(n)$, $x_3(n)$ ... $x_k(n)$ may be individually up-sampled and filtered by transmitter 320, in accordance with their order of m-ary modulation scheme and disparate operating data rates. It will be understood that filtering process in transmitter 320, may be based on root raised cosine (RRC) filter technology and is performed in such a manner that, upon combining the k filtered digital data input streams $x_1(n)$, $x_2(n)$, $x_3(n)$ ... $x_k(n)$ into aggregate data stream y(n), the resultant spectrum conforms to the unified spectral mask specified by ETSI that efficiently utilizes the central and skirt areas of the specified unified spectral mask.

As shown, aggregate digital data stream y(n) may be transmitted to a dispersive channel 322, such as a suitable backhaul link. While travelling through backhaul link channel 322, transmitted aggregate digital data stream y(n) may get effected by phase noise as well as AWGN resulting in noise effected aggregate data stream y'(n).

Further, receiver 324 may receive the noise-effected aggregate digital data stream y'(n). As noted above, receiver 324 may be configured to successively process aggregate digital data stream y'(n) to provides k output digital data streams $y_1(n)$, $y_2(n)$, $y_3(n)$ ... $y_k(n)$ in accordance with the k input digital data streams $x_1(n)$, $x_2(n)$, $x_3(n)$ ... $x_k(n)$. While processing the noise-affected aggregate digital data stream y'(n) for each of the digital data streams $y_k(n)$, receiver 324 operates to treat information related to all other data streams as noise and subtracts them from noise-affected aggregate data stream y'(n). A similar treatment is applied for the decoding operations applied to the remaining output data streams.

Figure 4:
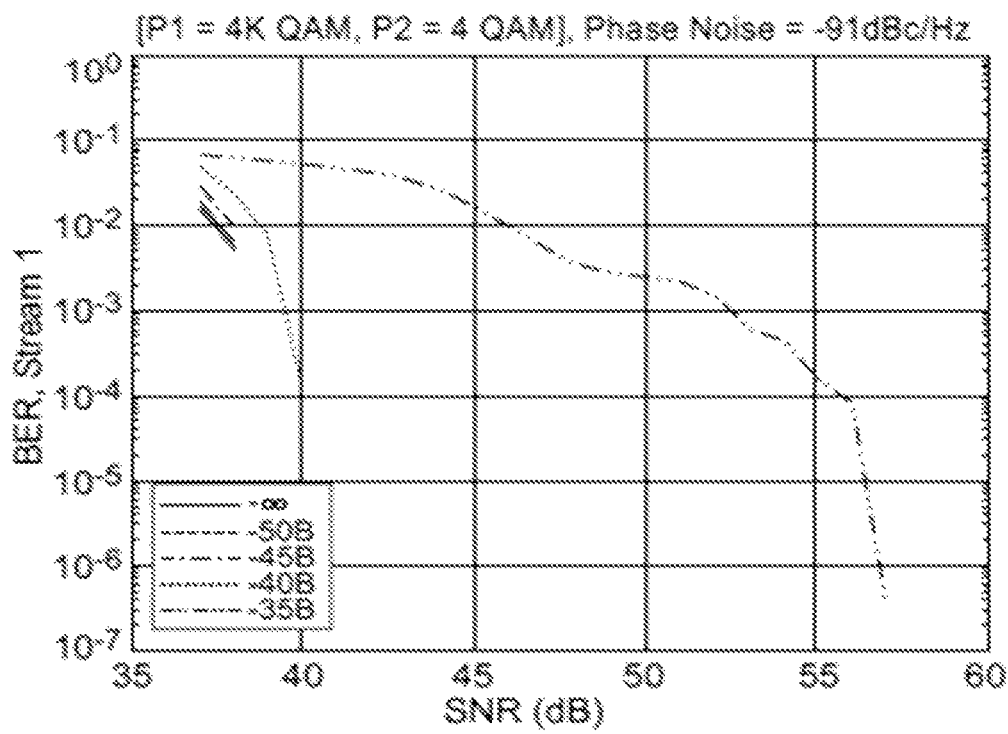
FIGS. 4-6 depicts simulation results in terms of BER performance measure as a function signal-to-noise ratio, in accordance with various embodiments of the present disclosure.
Figure 5:
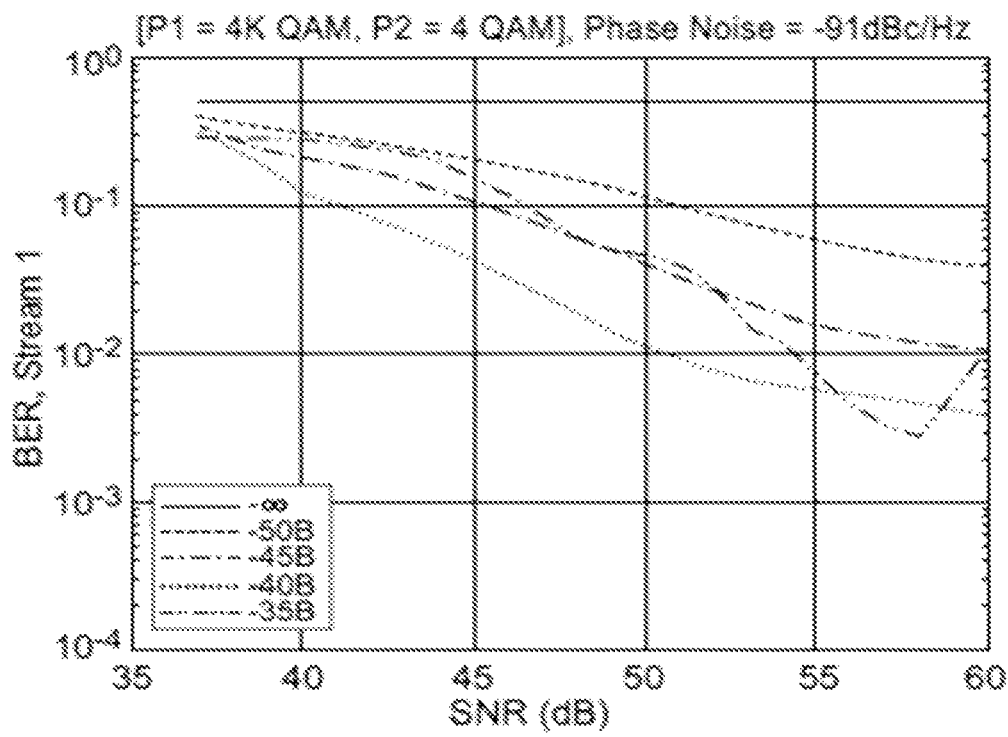
Figure 6:
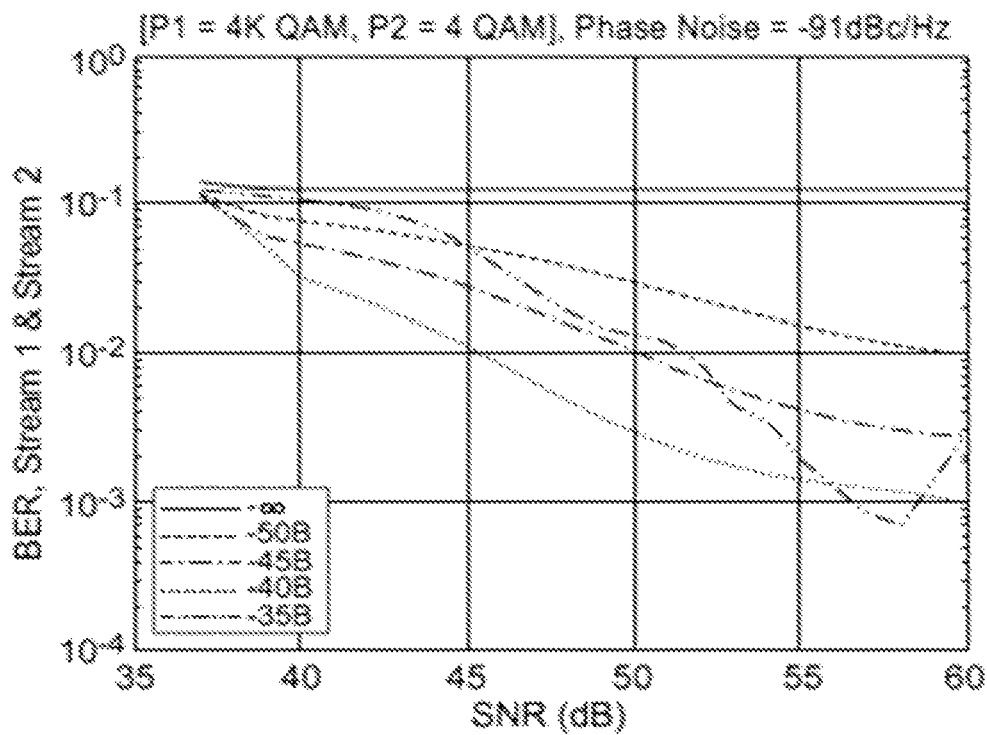

FIGS. 4-6 depict simulation results regarding the BER performance of superposition-based transceiver apparatus 200 as a function signal-to-noise ratio (SNR), in accordance with various embodiments of the present disclosure.

In concert with the disclosed embodiments, the simulation parameters employ practical implementation parameters, such as a Rummler channel having a notch depth of B=5 dB and notch frequency of $f_0$=10 MHz, a receiver local oscillator (LO) exhibiting a phase noise level of the −91 dBc/Hz, measured at an offset frequency of 100 kHz from the carrier frequency. In addition, signal baseband bandwidth as $B_{CH}$=27 MHz, while the first data stream may use a 4096-QAM alphabet whose PSD may occupy half the total bandwidth, and the second data stream may a 4-QAM constellation whose PSD may occupy the total bandwidth.

FIGS. 4, 5, and 6 depict the BER performance for two digital data streams, namely, digital data stream 1, digital data stream 2, and the aggregate digital data stream, respectively. As depicted, the simulation conditions sweep over a range of SNR values at various power levels of the digital data streams.

Figure 7:
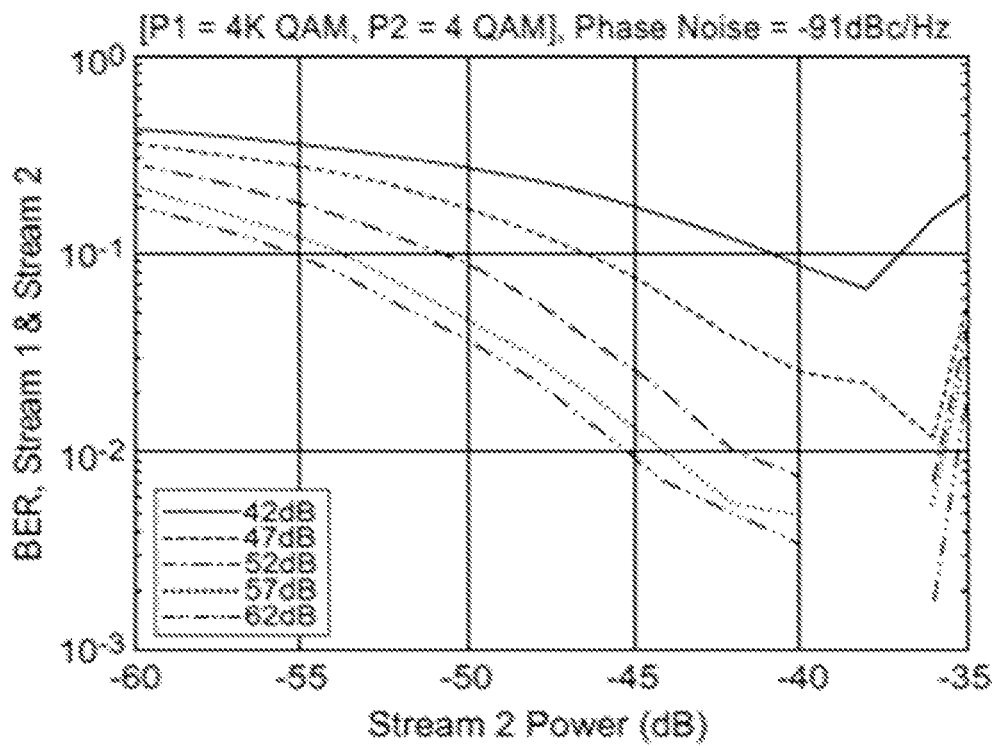
FIGS. 7-8 depicts simulation results presenting a comparison of the relative power difference between first data stream and second data stream, in accordance with various embodiments of the present disclosure.
Figure 8:
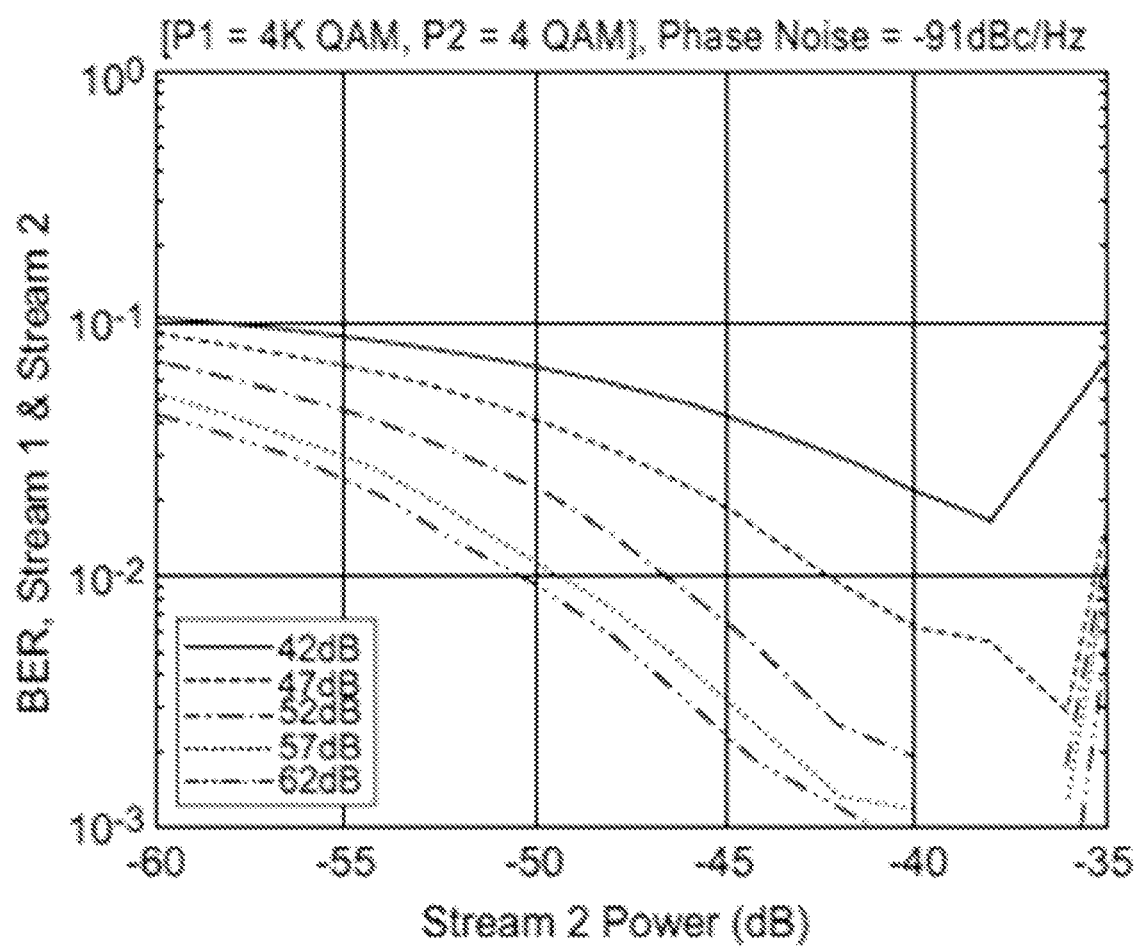

FIGS. 7-8 depict the simulation results that compare the relative power difference between first data stream and second data stream, in accordance with various embodiments of the present disclosure. FIG. 6 illustrates BER of the second data stream and FIG. 7 illustrates the BER of the composite signal for various power levels of the high-power first stream. As shown, there is an optimal SNR range for which the BER performance is adequate.

Figure 9:
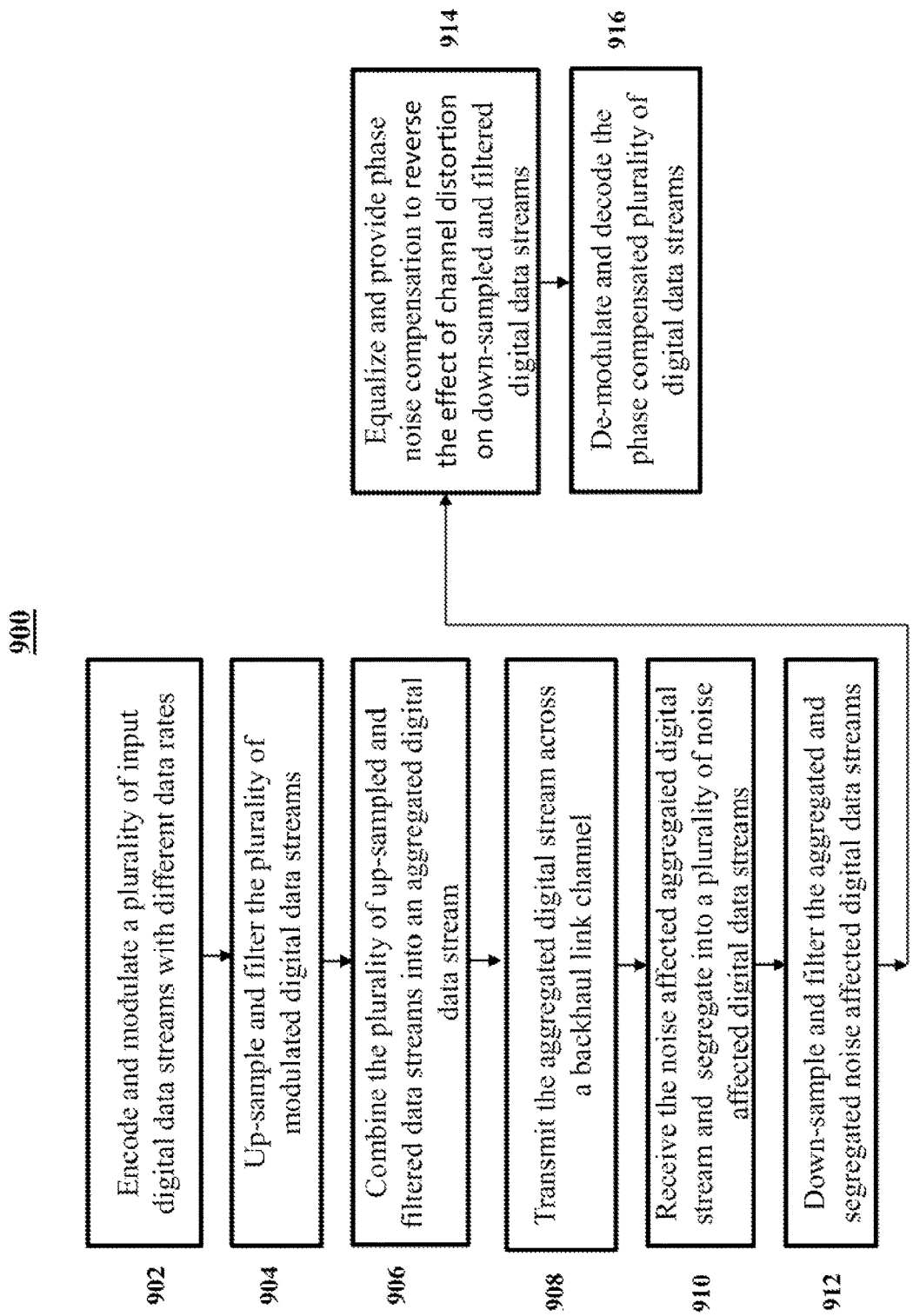
FIG. 9 depicts a functional flow diagram of superposition transceiver processing, in accordance with various embodiments of the present disclosure.

FIG. 9 depicts a functional flow diagram of process 900 directed to the operational tasks of superposition-based transceiver processing, in accordance with various embodiments of the present disclosure.

As shown, process 900 begins at task block 902, in which superposition based transceiver apparatus 200 encodes and modulates plurality of digital data streams operated at different data rates. As noted above, encoders 204A and 204B operate to encode and supply encoded data streams to modulators 206A and 206B. In turn modulators 206A and 206B modulates plurality of data streams at different order of m-ary modulation schemes in accordance with their respective data rates.

Process 900 proceeds to task block 904, where apparatus 200 operate to up-sample and filter plurality of modulated digital data streams. As noted above, RRC transmitter filters 208A and 208B operates to perform up-sampling and filtering the plurality of modulated digital data stream in accordance with data rates, and unified spectral mask specified by ETSI.

At task block 906, apparatus 200 operates to combine plurality of filtered digital data streams into aggregated digital data stream. As discussed above, signal mixer 210 mixes the digital data streams supplied by RRC transmitter filters 208A and 208B into aggregated digital data stream.

Process 900 advances to task block 908, where apparatus 200 operates to transmit the aggregated digital stream across a backhaul link channel. As shown above, aggregated digital stream from the output of signal mixer 210 is transmitted to a dispersive channel modelled as Rummler channel 212A.

Process 900 proceeds to task block 910, where apparatus 200 operate receive the noise affected aggregated digital stream and sequentially segregate the aggregated data stream into plurality of noise affected digital data streams. That is, as described above, signal mixer 218 receives and subtracts the decoded and regenerated digital data stream from aggregated digital stream.

At task block 912, apparatus 200 operates on noise affected aggregated digital data stream and noise affected segregated digital data streams and perform down-sampling and filtering. As noted above, RRC receiver filters 220A and 220B operates to perform down-sampling and filtering of aggregated digital data stream and segregated data streams respectively, in accordance with and data rates.

Process 900 proceeds to task block 914, apparatus 200 operates to preform equalization and phase noise compensation on filtered digital data streams. As discussed above, signal equalizers 222A in conjunction with phase noise compensation module 224A and signal equalizers 222B in conjunction with phase noise compensation module 224B may be configured to reverse the effect of distortion that may incurred in aggregated digital data stream during transmission through the backhaul link channel.

Finally, at task 916, apparatus 200 operate to decode and de-modulate phase compensated plurality of digital data streams. As noted above, de-modulators 226A and 226B de-modulates phase compensated plurality of digital data streams at different order of m-ary modulation schemes and supply de-modulated digital data streams to decoders 228A and 228B. In turn, decoders 228A and 228B decodes plurality of digital data streams to produce data streams manifesting the informational content of the original data streams.

Thus, by virtue of the techniques provided by superposition-based transceiver apparatus 200, efficient spectrum utilization and data capacities may be achieved, such that total backhaul channel link costs may be reduced through the use of efficient processing and cost effective components.

It is to be understood that the operations and functionality of the described superposition based transceiver apparatus, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A superposition-based transceiver, comprising:
   a plurality of encoders configured to encode a plurality of input digital data streams, wherein each of the plurality of input digital data streams operates at different data rates;
   a plurality of modulators configured to modulate the plurality of encoded digital data input streams, wherein each of the plurality of encoded digital data streams is modulated at a different order of an m-ary modulation scheme in accordance with the respective data rates of each of the plurality of input digital data streams;
   a plurality of transmitter filters configured to perform up-sampling and filtering of the plurality of modulated digital data streams;
   a signal mixer configured to combine the plurality of up-sampled and filtered digital data streams into a single aggregate digital data stream such that the single aggregate digital data stream contains spectral characteristics that substantially conform to both a central area and a skirt area of a unified spectral emission mask, as specified by European Telecommunications Standards Institute (ETSI).

2. The superposition-based transceiver of claim 1, wherein each of the plurality modulated digital data streams is up-sampled in accordance with the respective data rates of each of the plurality of input digital data streams operating at different data rates.

3. The superposition-based transceiver of claim 2, wherein each of the plurality of up-sampled digital data streams is filtered in accordance with the respective data rates of each of the plurality of input digital data streams operating at different data rates.

4. The superposition-based transceiver of claim 1, wherein the plurality of transmitter filters are configured to operate as root raised cosine (RRC) filters.

5. The superposition-based transceiver of claim 1, wherein the plurality encoders are configured to operate as low-density parity-check (LDPC) encoders.

6. The superposition-based transceiver of claim 1 further comprising a plurality of error rate calculation units configured to calculate at least one of a Bit Error Rate (BER) and Signal-to-Noise ratio (SNR).

7. The superposition-based transceiver of claim 1 further comprising a plurality of phase noise compensation units configured to mitigate effects of phase distortion due to a dispersive channel.

8. The superposition-based transceiver of claim 1 further comprising a plurality of equalizers configured to mitigate effects of inter-symbol interference (ISI).

9. The superposition-based transceiver of claim 8, wherein the plurality of equalizers are configured to operate in accordance with a Bahl-Cocke-Jelinek-Raviv (BCJR) scheme.

10. A method of superposition-based transmission and reception of digital data streams, comprising:
    encoding a plurality of input digital data streams, wherein each of the plurality of input digital data streams operates at different data rates;
    modulating the plurality of encoded digital data streams, wherein each of the plurality of encoded digital data streams is modulated at a different order of an m-ary modulation scheme in accordance with the respective data rates of each of the plurality of input digital data streams;
    up-sampling and filtering the plurality of modulated digital data streams;
    combining the plurality of up-sampled and filtered digital data streams into a single aggregate digital data stream such that the single aggregate digital data stream contains spectral characteristics that substantially conform to both a central area and a skirt area of a unified spectral emission mask, as specified by European Telecommunications Standards Institute (ETSI).

11. The method of claim 10, wherein each of the plurality modulated digital data streams is up-sampled in accordance with the respective data rates of each of the plurality of input digital data streams operating at different data rates.

12. The method of claim 11, wherein each of the plurality of up-sampled digital data streams is filtered in accordance with the respective data rates of each of the plurality of input digital data streams operating at different data rates.

13. The method of claim 10, wherein the up-sampling and filtering the plurality of modulated data input streams are based on root raised cosine (RRC) filters.

14. The method of claim 10, wherein the encoding operates in accordance with a low-density parity-check (LDPC) encoding scheme.

15. The method of claim 10, further comprising calculating at least one of a Bit Error Rate (BER) and Signal-to-Noise ratio (SNR).

16. The method of claim 10, further comprising mitigating phase distortion effects due to a dispersive channel.

17. The method of claim 10, further comprising mitigating inter-symbol interference (ISI) effects.

18. The method of claim 17, wherein the mitigating of ISI effects operates in accordance with a Bahl-Cocke-Jelinek-Raviv (BCJR) scheme.

\* \* \* \* \*